United States Patent
Jensen et al.

(10) Patent No.: US 9,796,266 B2
(45) Date of Patent: Oct. 24, 2017

(54) ACTIVE FUEL CONTROL SYSTEM FOR AGGRESSIVE DRIVERS

(71) Applicant: FORD GLOBAL TECHNOLOGIES, LLC, Dearborn, MI (US)

(72) Inventors: John W. Jensen, Canton, MI (US); Mahmoud Yousef Ghannam, Canton, MI (US); David James Bauch, South Lyon, MI (US); Howard Churchwell, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 15/043,824

(22) Filed: Feb. 15, 2016

(65) Prior Publication Data

US 2017/0232841 A1   Aug. 17, 2017

(51) Int. Cl.
  *B60K 28/14* (2006.01)
  *F02D 41/02* (2006.01)
  *F02D 41/26* (2006.01)
  *B60K 28/02* (2006.01)

(52) U.S. Cl.
  CPC .............. *B60K 28/14* (2013.01); *B60K 28/02* (2013.01); *F02D 41/021* (2013.01); *F02D 41/26* (2013.01); *B60W 2520/105* (2013.01); *B60W 2540/30* (2013.01); *B60W 2710/06* (2013.01); *B60Y 2300/26* (2013.01); *B60Y 2302/07* (2013.01); *F02D 2200/606* (2013.01)

(58) Field of Classification Search
  CPC ....... B60K 28/14; B60K 28/02; F02D 41/021; F02D 41/26; F02D 2200/606; B60W 2520/105; B60W 2540/30; B60W 2710/06; B60Y 2300/26; B60Y 2302/07
  USPC ........................................................ 701/110
  See application file for complete search history.

(56) References Cited

U.S. PATENT DOCUMENTS

| | | | |
|---|---|---|---|
| 6,640,174 B2 | 10/2003 | Schondorf et al. | |
| 6,766,235 B2 | 7/2004 | Frimberger et al. | |
| 7,055,640 B2 | 6/2006 | Cook | |
| 7,561,951 B2 | 7/2009 | Rao et al. | |
| 8,214,134 B2 | 7/2012 | Le et al. | |
| 2002/0017268 A1* | 2/2002 | McConnell | B60K 28/14 123/198 D |
| 2007/0100527 A1* | 5/2007 | Rao | B60R 19/483 701/45 |
| 2008/0098993 A1* | 5/2008 | Hoffman | F02M 37/08 123/513 |

(Continued)

*Primary Examiner* — Joseph Dallo
*Assistant Examiner* — Yi-Kai Wang
(74) *Attorney, Agent, or Firm* — Frank A. MacKenzie; Brooks Kushman P.C.

(57) ABSTRACT

A vehicle includes a fuel pump configured to deliver fuel to an internal combustion engine. The vehicle also includes an accelerometer configured to detect acceleration of a vehicle component. A plurality of sensors are provided about the vehicle for detecting conditions that would indicate aggressive driving. At least one controller is provided and is in communication with the fuel pump, the accelerometer, and the sensors. The at least one controller is programmed to adjust a fuel pump shutoff threshold to an adjusted shutoff threshold in response to one or more conditions indicating aggressive driving. The at least one controller then shuts off the fuel pump in response to the acceleration exceeding the adjusted shutoff threshold.

20 Claims, 3 Drawing Sheets

(56) References Cited

U.S. PATENT DOCUMENTS

2011/0241865 A1\* 10/2011 Saito ................ B60W 50/14
340/439

\* cited by examiner

ACTIVE FUEL CONTROL SYSTEM FOR AGGRESSIVE DRIVERS

TECHNICAL FIELD

The present disclosure relates to controlling the fuel distribution into the engine based on conditions and factors that indicate that the vehicle is being driven aggressively or is subject to antagonistic road profiles.

BACKGROUND

Vehicles that include an internal combustion engine typically include one or more fuel pumps to deliver fuel to the engine. Vehicles can also be equipped with several sensors, such as accelerometers and impact sensors, that detect when the vehicle is involved in a collision. For safety purposes, a controller in the vehicle is configured to shut off the fuel pump when the vehicle is involved in a collision.

SUMMARY

According to one embodiment, a vehicle comprises a fuel pump, an accelerometer, and at least one controller. The fuel pump is configured to deliver fuel to an engine. The accelerometer is configured to detect acceleration of a vehicle component. The at least one controller is programmed to (i) adjust a fuel pump shutoff threshold to an adjusted shutoff threshold in response to one or more conditions indicating aggressive driving, and (ii) shut off the fuel pump in response to the acceleration exceeding the adjusted shutoff threshold.

The conditions indicating aggressive driving can be derived from a plurality of sensors configured to detect (i) physical conditions of a driver, (ii) operating conditions of the vehicle, and/or (iii) external road conditions.

According to another embodiment, a vehicle comprises a fuel pump, an accelerometer, one or more sensors, and at least one controller. The fuel pump is configured to deliver fuel to an engine. The accelerometer is configured to detect acceleration of a vehicle component. The one or more sensors are configured to detect aggressive driving. The at least one controller is programmed to adjust a fuel pump shutoff threshold to an adjusted shutoff threshold in response to detected aggressive driving, and inhibit shutoff of the fuel pump in response to the acceleration being between the thresholds.

According to another embodiment, a method for influencing operation of a fuel pump in a vehicle is provided. The method includes receiving signals from one or more accelerometers indicating acceleration of a vehicle component. A threshold is defined in which fuel is inhibited from being delivered to the engine in response to the acceleration exceeding the threshold. Signals are received from one or more sensors indicating aggressive driving. The threshold is adjusted to an adjusted threshold in response to the aggressive driving.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Various sensors are described below, the data output of which is used to control the operating controls of an engine fuel pump. As used herein, the term "sensor" is intended to be broadly construed unless qualified with a description of what type of sensor the sensor actually is. For example, the unqualified term of "sensor" can refer to pressure sensors, locational sensors, temperature sensors, as well as sensors that are part of vision systems in the vehicle such as radar, cameras, inferred sensors, etc. Description of these sensors and how they affect the operation of the fuel pump is described additionally below.

Figure 1:
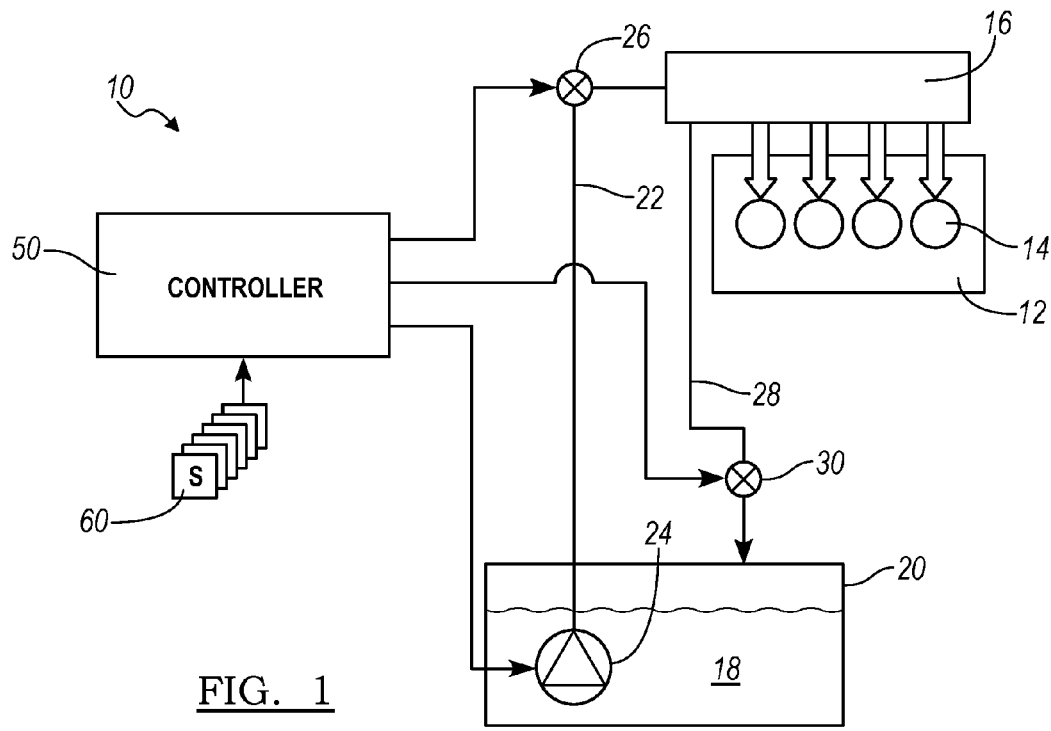
FIG. 1 is a schematic of an engine control system in a vehicle, according to one embodiment.

Referring now to the figures, FIG. 1 schematically shows an example embodiment of an engine system 10 of a vehicle. The engine system includes an internal combustion engine 12 having one or more combustion chambers 14. Each combustion chamber 14 may include a fuel injector for delivering fuel thereto. In some embodiments, each combustion chamber 14 may include a direct fuel injector configured to inject fuel directly into that combustion chamber. In other embodiments, port fuel injectors may be provided as an alternative to or in addition to direct fuel injectors.

The engine system 10 may include a fuel rail 16 configured to distribute fuel to the combustion chambers 14. Fuel 18 is supplied to the fuel rail 16 from a fuel tank 20 via a fuel passage 22. The fuel passage 22 may include one or more fuel pumps. For example, a low pressure fuel pump 24 may be provided in the fuel tank 20 and powered by an electric motor to send fuel out of the tank 20 and into the fuel passage 22. Another fuel pump, such as a high pressure fuel pump (not shown) may be provided along the fuel passage 22 outside of the fuel tank 20.

The fuel passage 22 may also include one or more valves. For example, a valve 26 is controlled to selectively enable fuel to enter the fuel rail 16. The valve 26 can be controlled to modulate the mass flow and pressure of the fuel, according to known methods.

The engine system 10 also includes a return passage 28 that returns excess or non-combusted fuel from the fuel rail 16 back to the fuel tank 20. The return line 28 also includes a valve 30 for selectively controlling the flow of fuel back into the tank 20. The return line enables the fuel pump 24 to pressurize the fuel injectors without changing the pressure in the fuel tank 20.

The engine system 10 shown in FIG. 1 is merely exemplary and is not intended to be limiting on the scope of this disclosure. Other structure is contemplated to exist in the engine system. For example, commonly-known structure such as fuel filters, pressure sensors, bypass lines, and the like are contemplated to be included in the engine system 10.

The engine system 10 further includes an associated controller 50 such as an engine system controller or engine control module (ECM). While illustrated as one controller, the controller 50 may be part of a larger control system and may be controlled by various other controllers throughout the vehicle, such as a vehicle system controller (VSC). It should therefore be understood that the powertrain control unit 50 and one or more other controllers can collectively be referred to as a "controller" that controls various actuators in response to signals from various sensors to control functions such as starting/stopping fuel delivery to the engine 12, operating/disabling the fuel pump 24, etc. The controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the embodiment of FIG. 1, the controller 50 may communicate signals to and/or from the fuel pump 24, the valves 26, 30, as well as several sensors 60 outside of the engine system 10. The controller 50 may also communicate signals to and/or from ignition controllers, powertrain control module(s), and other such control modules that control specific components within the engine system 10.

One control system that is provided in typical vehicles governs shutting off the fuel pump or otherwise preventing delivery of fuel to the engine in response to a detected impact event (i.e., a collision). This is known as a fuel cut-off (FCO) control strategy. Such an FCO control strategy can communicate with a restraint control module (RCM) that receives signals that indicate an impact event. Several, but limited, inputs are known to be provided to such a FCO strategy. For example, accelerometers on the chassis, at the wheels, at the bumpers, and other areas about the car can detect a high degree of probability that an impact even has occurred based on the acceleration exceeding a set threshold. Based on this determined impact event occurring, the fuel pump is shut off for safety.

Figure 2:
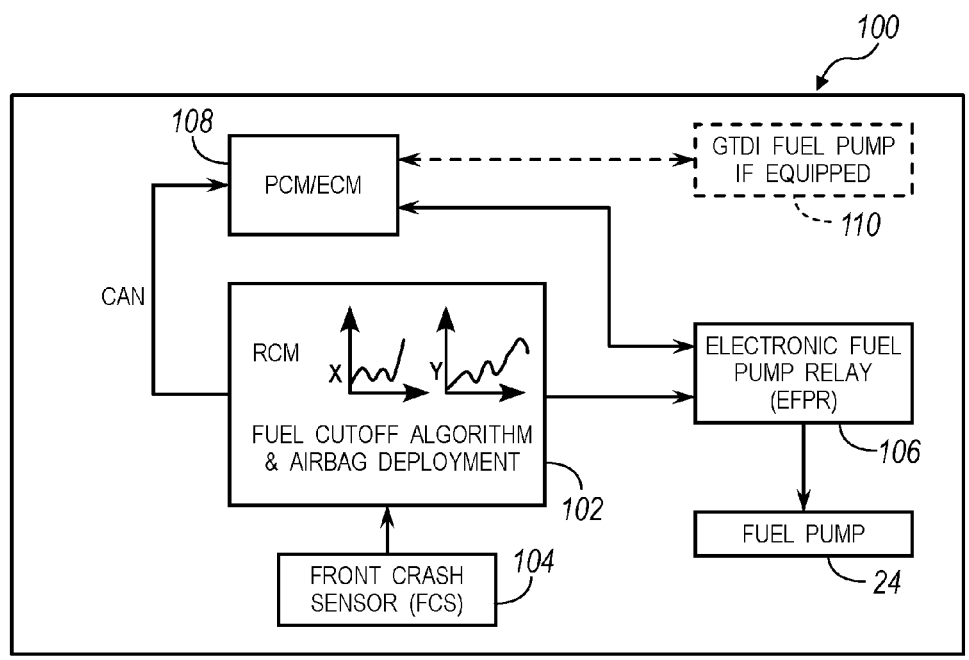
FIG. 2 is a schematic of a control system in the vehicle for operating the fuel pump, according to one embodiment.

An example of such a control system 100 is shown in FIG. 2. The RCM 102 receives signals from a front crash sensor (FCS) 104, along with signals indicating lateral (x-direction) acceleration and forward-and-reverse (y-direction) acceleration. These sensors allow the associated controllers to determine whether a collision has occurred, according to known methods. Supplemental restraints such as airbags can be activated if the detected collision is severe in nature. The RCM then applies logic to determine if the fuel pump should be cut off to prevent delivery of fuel to the engine, according to known methods. In one example of doing so, the RCM sends signals to an electronic fuel pump relay (EFPR) 106, commanding the shutoff of the fuel pump 24. The RCM can also send signals to a powertrain control module (PCM) and/or an engine control module (ECM) 108 to communicate the shutoff to the EFPR. If a gasoline turbocharged direction injection (GTDI) fuel pump 110 is provided, then the PCM/ECM can command the shutoff of that fuel pump based on the sensors indicating a collision event.

Previous FCO control strategies have not been able to properly discern between impact events and extremely aggressive driving. In other words, due to high acceleration forces, yaw, pitch, and the like, aggressive driving in high-performance vehicles has the potential to give false positives as to the presence of an impact event. This can potentially cut off fuel to the engine even while the vehicle has not been involved in a collision.

Therefore, according to several embodiments of the present disclosure, a control system is provided for receiving signals that indicate that aggressive driving behavior or conditions are taking place. Based on the aggressive driving behavior, the set acceleration threshold that would normally shut off the fuel pump if exceeded (as described above) is altered to reflect the aggressive driving. This increases the accuracy of determining whether an impact event has occurred and reduces or removes the occurrences of improperly shutting off the fuel pump.

As described above with reference to FIG. 1, the controller 50 also receives signals from other sensors 60 that are part of other systems in the vehicle. According to various embodiments of the present disclosure, the controller 50 is specifically programmed to control deliver of fuel into the combustion chambers 14 based on the signals from other sensors in the vehicle. In one or more embodiments, for example, the controller 50 is programmed to inhibit delivery of fuel into the engine by, for example, disabling the fuel pump 24, in response to signals received from other sensors 60 about the vehicle.

Figure 3:
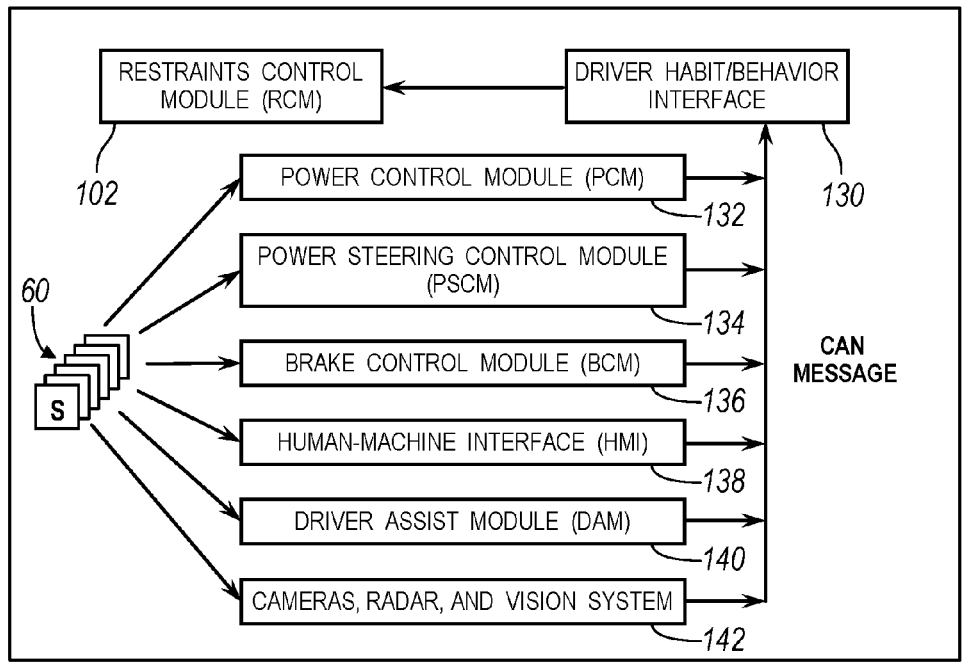
FIG. 3 is a control diagram illustrating several sensors and control modules that supply data to other control modules for improving the control of the fuel pump.

FIG. 3 schematically shows an example of several control modules that supply additional information to the RCM 102, according to various embodiments of this disclosure. This additional data provided to the RCM allows the RCM to determine if aggressive driving behaviors are occurring that require the adjustment of the threshold at which the fuel pump is shut off. The RCM receives input from a driver habit/behavior interface 130. This interface is specifically designed and programmed to receive targeted signals from various sensors 60 that would indicate whether purposeful, aggressive driving behavior is noticed. For example, the power control module (PCM) 132 or powertrain control module can supply signals such as changes in acceleration pedal demands, engine speed and RPM rates, gear position, suspension responses, exhaust chemistry, and temperatures of powertrain and other components (e.g., brake linings, dampers, etc.)

A power steering control module (PSCM) 134 can supply signals indicating steering behavior, such as the steering wheel angle position, and rate of change of steering angle. The steering wheel may also be equipped with pressure or grip sensors that are configured to detect the grip of the driver, with a heightened grip indicating aggressive driving.

A brake control module (BCM) 134 can supply signals indicating braking behavior, such as changes in brake pedal demands and temperatures of the brake linings.

A human-machine interface 138 can communicate with an interactive display in a vehicle, such as a LED/LCD in-vehicle screen, or heads-up display. The human-machine interface can receive signals from the interactive display indicating the driver selecting a "sport" drive mode, or the like, in which the driver is desiring that the vehicle tighten up steering responses, sharpen throttle responses, and raise shift points or hold gears for longer amounts of time.

A driving assist module (DAM) 140 can also supply signals. The DAM can include visual sensors such as cameras, sonar, radar, and the like to sense external objects near or approaching the vehicle to allow the vehicle to automatically react. For example, the DAM can be part of an autonomous driving system, automatic parking system, and other such systems known in the art that receive signals indicating the presence and location of external objects and road conditions.

Additional cameras, radar devices, and vision systems 142 can communicate additional signals to the RCM. These additional systems can include sensors and cameras for use in pothole detection systems, road terrain signals, lane avoidance systems, and active safety control systems. In one embodiment, an onboard camera that faces the driver is provided and configured to communicate with a controller configured to implement facial recognition software to detect changes in head movement and facial expressions such as eyebrow and mouth movement. In one embodiment, a seat-weight sensor is provided for determining the location and magnitude of weight on at least the driver's seat. Shifting weight during driving can indicate aggressive driving behavior.

With any of the above-described signals, the controller can compare the signals to individual thresholds. As the number of outputs from these sensors increases above their respective threshold, the controller can correspondingly increase the adjusted threshold for when the fuel pump is shut off. This is described in more detail with respect to FIGS. 4-5.

Figure 4:
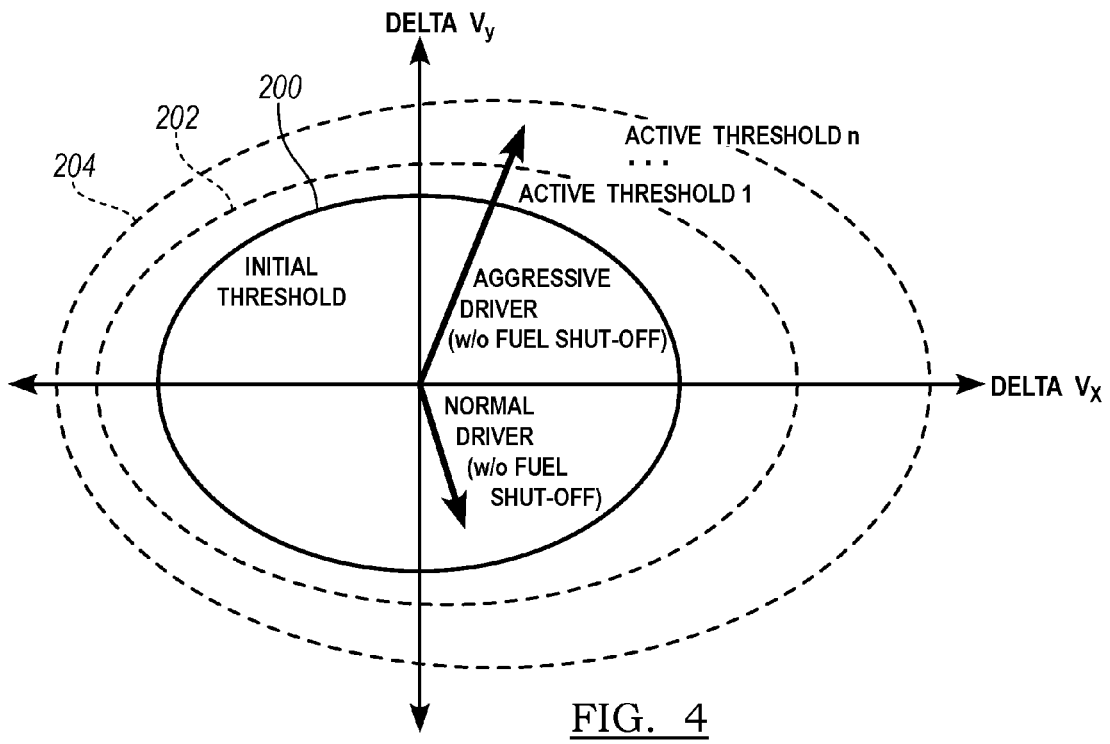
FIG. 4 is a plot of an initial threshold and several adjusted thresholds with respect to changes in velocity in both the lateral direction and the forward-and-reverse direction. The thresholds adjust change the magnitude of acceleration necessary to cause fuel to be prevented from delivering to the engine, according to one embodiment.

Referring to FIG. 4, a plot of changes in velocity in the lateral direction (x-direction) and forward-and-reverse direction (y-direction) is illustrated. A first threshold 200 is provided by the associated controller. The first threshold is an acceleration threshold, or change-in-velocity threshold that may be preprogrammed as a set value. When acceleration is detected by the one or more of the plurality of accelerometers placed about the vehicle, the controller compares the magnitude of acceleration to the threshold 200. During normal driving conditions, if the acceleration exceeds the threshold 200, the controller commands the fuel pump to shut off, as a collision event is detected as being a probable occurrence. Otherwise, while the acceleration remains below the threshold and within the oval-shaped perimeter 200, the fuel pump operates per normal.

If, however, the various sensors described above indicate that aggressive driving conditions are present, the threshold can be adjusted. For example, and as will be described in more detail with respect to FIG. 5, as each sensor detects a condition that exceeds a respective threshold (e.g., grip strength on the steering wheel exceeding a grip-strength threshold, acceleration demands changing at a rate that exceeds a threshold, etc.) indicating aggressive driving, then the initial threshold 200 can be increased to an adjusted threshold 202. As even more sensors detect conditions that exceed other respective threshold (e.g., changes in steering wheel angle over time exceeding a threshold, an onboard camera detecting head movements to an extend exceeding a threshold, etc.) indicating aggressive driving, then the adjusted threshold 202 can be further adjusted to a second adjusted threshold 204. As the threshold increases, the vehicle is allowed to correspondingly experience higher and higher acceleration magnitudes without causing the controller to shut off the fuel pump. In short, the controller is programmed to adjust a fuel pump shutoff threshold to an adjusted shutoff threshold in response to one or more conditions indicating aggressive driving. The fuel pump can remain active once the acceleration passes the initial fuel pump threshold. But, in response to the acceleration exceeding the adjusted shutoff threshold, the controller shuts off the fuel pump.

Figure 5:
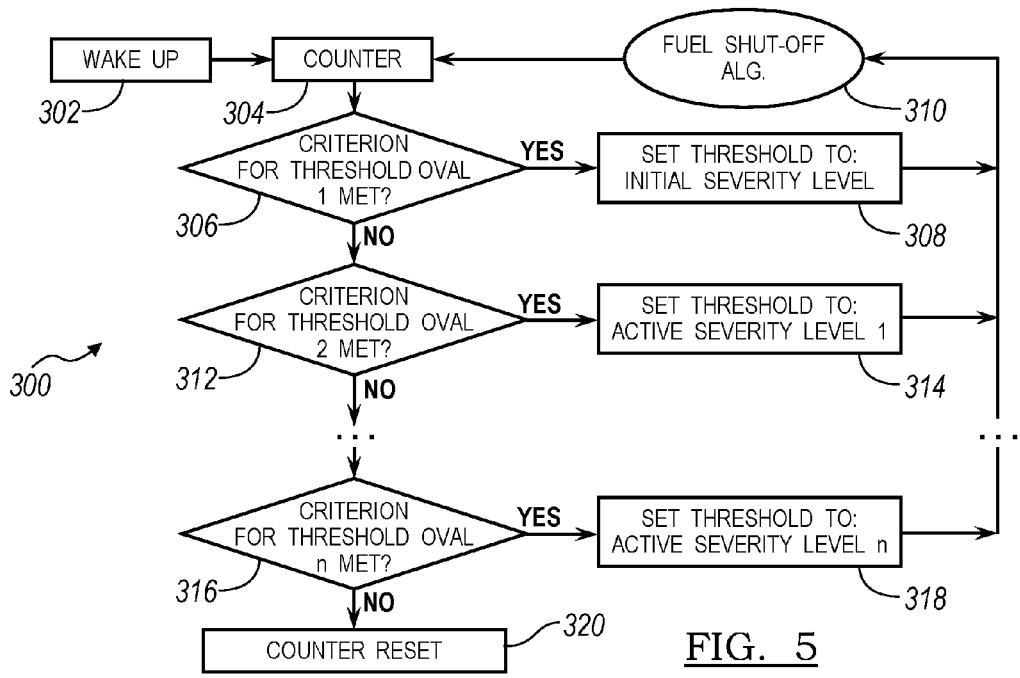
FIG. 5 is a flow chart of a control algorithm for adjusting the thresholds of FIG. 4, according to one embodiment.

FIG. 5 illustrates a flow chart of an example of an algorithm 300 implemented by one or more of the controllers. The process wakes up or begins at 302 based on the vehicle starting, for example. The initial threshold is set, shown at 200 in FIG. 4. A counter is initiated at 304. A first criterion is measured, according to the various embodiments above regarding individual factors that can indicate aggressive driving. If the first criterion is met at 306, the controller adjusts the threshold to the adjusted threshold at 308, such as the adjusted threshold 202 in FIG. 4. At 310, the fuel shutoff algorithms described above are implemented in which the vehicle's directional acceleration is measured against the adjusted threshold, and the controller determines whether or not to shut off the fuel pump.

The process continues at 312 in which a second criterion is measured for indicating whether aggressive driving is taking place. And, at 314, the controller adjusts the threshold to another adjusted threshold to reflect the increasing data indicating aggressive driving. The process repeats for n number of threshold comparisons and n number of adjusted thresholds set at 318. If no criteria indicate aggressive driving, the counter resents at 320 and the process begins anew.

Figure 6:
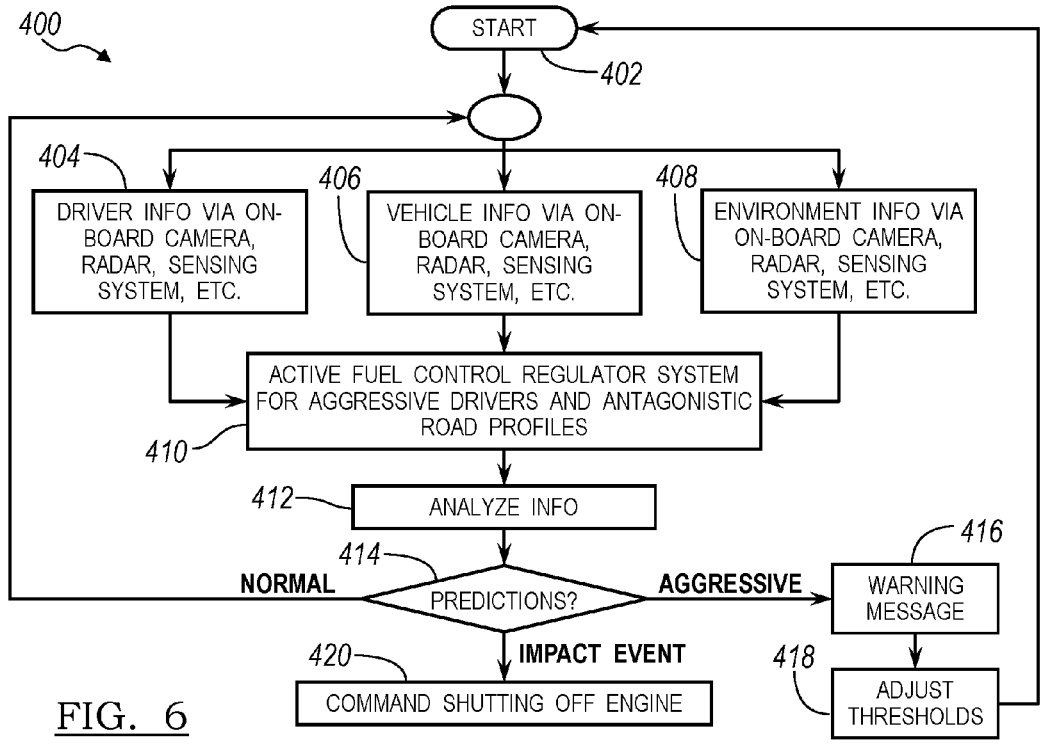
FIG. 6 is a control diagram for controlling a fuel pump in an active fuel control regulator system for aggressive drivers and antagonistic road profiles, according to one embodiment.

FIG. 6 illustrates a flowchart of an exemplary algorithm 400 implemented by the controllers for determining aggressive driving. Concepts for several of these steps of the algorithm are discussed above. The algorithm starts at 402. At 404, driver information is collected from on-board cameras, radar devices, sensing systems, etc. as described above that would indicate driver behavior within the vehicle, such as eye movement, head movement, weight shifting on the driver seat, etc. At 406, vehicle information is collected from on-board cameras, radar devices, sensing systems, etc. as described above that would indicate the operation and performance of the vehicle, such as gear shifting, acceleration demands, braking demands, etc. At 408, environmental information is collected from on-board cameras, radar devices, sensing systems, etc. as described above that would indicate the environment around the vehicle, such as other approaching vehicles, potholes, road surface grade, etc.

The controller collects all of this information at 410 as part of an active fuel control regulator system for aggressive drivers and antagonistic road profiles. The information is analyzed at 412 according to the methods described above. At 414, the controller determines whether the conditions indicate that the vehicle is being driven aggressively or "normal," i.e., non-aggressively. If the vehicle is not being driven aggressively, the process repeats. If the vehicle is being driven aggressively, the controller can cause a warning message at 416 to be displayed to the driver of such activity. The warning may be audible (e.g., though the vehicle's speaker system) and/or visible (through the human-machine interface, the heads-up display, the dashboard display, etc.). This can alert the driver that the vehicle is being driven aggressively, and the fuel pump may not be shut off per its normal programmed controls. The thresholds can be adjusted at 418 according to the methods described above. If the acceleration as detected by the accelerometers is large enough that it exceeds even the adjusted thresholds, then the fuel pump is disabled at 420 to shut off the engine.

While references above teach shutting off the fuel pump to prevent delivery of fuel to the engine, it should be understood that other mechanisms could activate to accomplish the same result. For example, valves can shut, bypass lines can open, and other such actions can take place that prevent fuel from being combusted for safety considerations.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
    a fuel pump configured to deliver fuel to an engine;
    an accelerometer for detecting acceleration of a vehicle component; and
    at least one controller programmed to
    adjust a fuel pump shutoff threshold to an adjusted shutoff threshold in response to one or more conditions indicating aggressive driving, and
    shut off the fuel pump in response to the acceleration exceeding the adjusted shutoff threshold.

2. The vehicle of claim 1, wherein the conditions indicating aggressive driving are derived from a plurality of sensors configured to detect physical conditions of a driver.

3. The vehicle of claim 2, wherein the plurality of sensors includes a steering wheel sensor configured to detect grip strength on a steering wheel such that the at least one controller is programmed to adjust the fuel pump shutoff threshold to the adjusted shutoff threshold based on grip strength.

4. The vehicle of claim 2, wherein the plurality of sensors includes a seat weight sensor configured to detect shifting weight by the driver such that the at least one controller is programmed to adjust the fuel pump shutoff threshold to the adjusted shutoff threshold based on shifting weight of the driver.

5. The vehicle of claim 2, wherein the plurality of sensors includes a camera configured to detect body or facial movements such that the at least one controller is programmed to adjust the fuel pump shutoff threshold to the adjusted shutoff threshold based on body or facial movements.

6. The vehicle of claim 1, wherein the conditions indicating aggressive driving are derived from a plurality of sensors configured to detect operating conditions of the vehicle.

7. The vehicle of claim 6, wherein the plurality of sensors includes driver demand sensors configured to detect at least one of acceleration demands, brake demands, and steering demands, such that the at least one controller is programmed to adjust the fuel pump shutoff threshold to the adjusted shutoff threshold based on driver demands.

8. The vehicle of claim 6, wherein the plurality of sensors includes a temperature sensor configured to detect a temperature of a powertrain component, such that the at least one controller is programmed to adjust the fuel pump shutoff threshold to the adjusted shutoff threshold based on the temperature of the powertrain component.

9. The vehicle of claim 1, wherein the conditions indicating aggressive driving are derived from one or more sensors configured to detect external road conditions.

10. A vehicle comprising:
    a fuel pump configured to deliver fuel to an engine;
    an accelerometer for detecting acceleration of a vehicle component;
    one or more sensors configured to detect aggressive driving; and
    at least one controller programmed to
    adjust a fuel pump shutoff threshold to an adjusted shutoff threshold in response to detected aggressive driving, and inhibit shutoff of the fuel pump in response to the acceleration being between the thresholds.

11. The vehicle of claim 10, wherein the detected aggressive driving is derived from a plurality of sensors configured to detect physical conditions of a driver.

12. The vehicle of claim 11, wherein the plurality of sensors includes a camera configured to track eyesight of a driver such that the at least one controller is programmed to adjust the fuel pump shutoff threshold to the adjusted shutoff threshold based on eyesight tracking.

13. The vehicle of claim 11, wherein the plurality of sensors includes a seat weight sensor configured to detect shifting weight by the driver such that the at least one controller is programmed to adjust the fuel pump shutoff threshold to the adjusted shutoff threshold based on shifting weight of the driver.

14. The vehicle of claim 11, wherein the plurality of sensors includes a camera configured to detect body or facial movements such that the at least one controller is programmed to adjust the fuel pump shutoff threshold to the adjusted shutoff threshold based on body or facial movements.

15. The vehicle of claim 10, wherein the detected aggressive driving is derived from a plurality of sensors configured to detect operating conditions of the vehicle.

16. The vehicle of claim 15, wherein the plurality of sensors includes driver demand sensors configured to detect at least one of acceleration demands, brake demands, and steering demands, such that the at least one controller is programmed to adjust the fuel pump shutoff threshold to the adjusted shutoff threshold based on driver demands.

17. The vehicle of claim 15, wherein the plurality of sensors includes an engine speed sensor configured to detect an operating speed of an engine, such that the at least one controller is programmed to adjust the fuel pump shutoff threshold to the adjusted shutoff threshold based on the operating speed of the engine.

18. The vehicle of claim 10, wherein the detected aggressive driving is derived from one or more sensors configured to detect external road conditions.

19. A method for influencing operation of a fuel pump in a vehicle, comprising:
    via one or more controllers, receiving signals from one or more accelerometers indicating acceleration of a vehicle component;
    defining a threshold in which fuel is inhibited from being delivered to an engine in response to the acceleration exceeding the threshold;
    via the one or more controllers, receiving signals from one or more sensors indicating aggressive driving;
    adjusting the threshold to an adjusted threshold in response to the aggressive driving; and
    via the one or more controllers, controlling the fuel pump based on a comparison between the acceleration and the adjusted threshold.

20. The method of claim 19, wherein the adjusting includes increasing the threshold.

* * * * *